Figure 1:
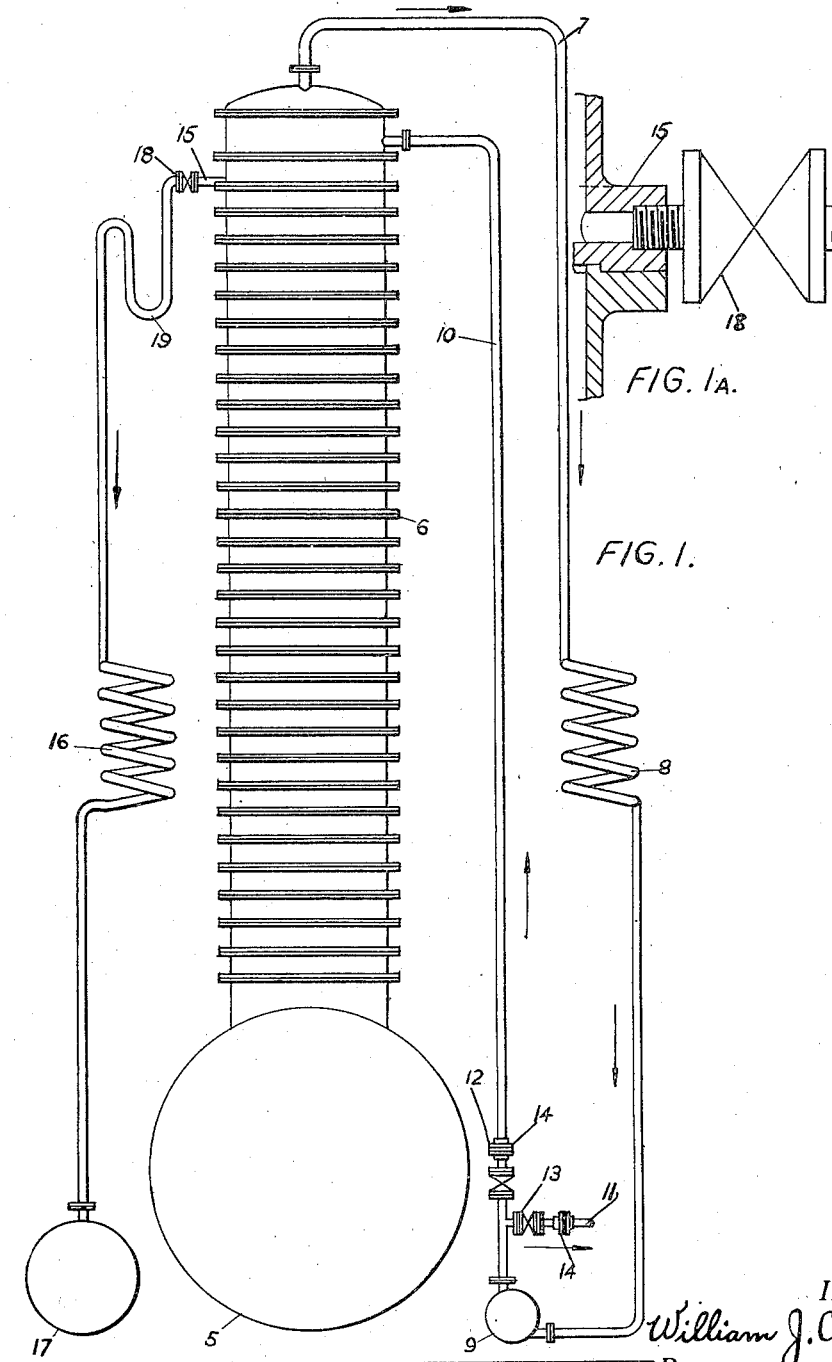

Patented Dec. 12, 1944

2,365,051

UNITED STATES PATENT OFFICE 2,365,051

SEPARATION OF LIQUIDS OF DIFFERENT BOILING POINTS FROM MIXTURES THEREOF BY FRACTIONAL DISTILLATION

William James Chadder, Guildford, England, assignor to Woodall-Duckham (1920) Limited, Guildford, England, a British company Application November 20, 1942, Serial No. 466,350
In Great Britain January 12, 1942

7 Claims. (Cl. 202—40)

This invention relates to an improvement in or a modification of the process of my patent application Serial No. 436,054 which is dated March 24, 1942 (hereinafter referred to as "the parent case"), and concerns an alternative method of operating the process of the parent case for the separation of liquids of different boiling points from mixtures thereof by fractional distillation.

The parent case describes and claims a method of reducing by a substantial amount the volume of the "intermediate fraction" which latter consists of a mixture of the two pure or commercially pure liquids of adjacent boiling points and is produced in passing progressively from one pure distillate to the pure distillate of next higher boiling point. The parent invention also enables the time required for the removal of the intermediate fraction to be cut down considerably as compared with the time taken for its removal in the normal method of fractional distillation.

The parent case is applicable to a batch still having a fractionating column associated with a total condenser for the distillate and a circuit for returning condensate as reflux liquid to the column. In the method of operation of the parent case, when it is found that, with the continued withdrawal of product, even at the lowest practicable rate (i. e. highest practicable reflux ratio) the vapour temperature at the outlet of the column continues to rise above the distillation temperature of the pure liquid last distilled (showing that the still has become exhausted of that liquid, and that all of it still remaining in the system is present in the column as an intermediate mixture, the amount of which in any given column and in any given conditions of operation is predetermined and is sensibly constant), then the withdrawal of product is stopped and all condensate is returned to the column as reflux (i. e. a condition of "total reflux" is set up), until a condition of equilibrium is established in the column, which is indicated by the attainment of a steady vapour temperature at the head of the column. In equilibrium conditions, the intermediate fraction is concentrated in the upper part of the column, the concentration of the lower-boiling liquid being greatest at the top of the column. Having, so to speak, segregated the intermediate fraction, the aim now is to remove it from the system as quickly and as completely as possible, while disturbing the equilibrium of the system for the shortest period of time and to the smallest practicable extent. This aim is attained in the parent case by interrupting the return of reflux to the column for one or more short periods, during which periods of zero reflux the intermediate fraction distilling over is withdrawn from the system at the full optimum distillation rate of the still. Between each such period of withdrawal of intermediate fraction (since two or more are usually necessary), all the condensate is returned to the column as reflux for so long a time as is necessary to re-establish equilibrium conditions in the column, and to re-concentrate the remaining intermediate fraction in the upper part of the column. Withdrawal of the intermediate fraction in one or more portions as described is continued, in the parent case, until the whole of the predetermined amount of the intermediate fraction, and any intermediate fraction in the reflux circuit, has been removed from the system, whereupon the condensate is again proportioned between product and reflux in amounts appropriate to the given raw material and apparatus, and distillation is continued.

The present invention provides a method of eliminating the intermediate fraction from the system, which is an alternative to that of the parent case. The present invention has the advantage that it can be applied to existing plants equipped with fractionating columns having dephlegmators from which condensate returns internally on to the uppermost plate of the column.

According to the present invention, the intermediate fraction resulting from the incomplete separation of two or more liquids of different boiling points from a mixture thereof by fractional distillation in a batch still having a plate-type fractionating column associated with a condenser for the distillate and with means for delivering reflux to the head of the column, is first concentrated on the upper plates of the column by the procedure of the parent case, and, in contrast to the procedure of the parent case, the intermediate fraction is then eliminated from the system in one or more side streams from one or more of the plates of the column, the whole of the intermediate fraction being eliminated either at one time or in a sequence of short discharges with one or more intervening periods during which periods the remaining portion of the intermediate fraction is re-concentrated in the upper part of the column by the procedure of the parent case, after which the distillation is continued to remove the next higher-boiling liquid.

In the present specification, "a plate-type fractionating column" means a column containing bubble-plates or perforated plates or plates of any type capable when in operation of holding up a volume of liquid.

Various methods of applying the invention in practice are illustrated in Figures 1 and 1A, 2, 3 and 4 of the accompanying drawings. The arrangement shown in each figure will now be described.

Referring to Figure 1, a batch still 5 has mounted thereon in the usual manner a plate-type fractionating column 6. Vapours from the top of the column 6 are passed by the pipe 7 to the condenser 8. Condensate is returned by the pump 9 through pipe line 10 to the top of the column 6 as reflux liquid, and a portion of the condensate can be withdrawn as product at 11. Valves 12 and 13, and flow-meters 14, are provided in the pipe lines 10 and 11, so that the condensate from condensers 8 can be proportioned between reflux and product as desired.

In accordance with the present invention, a single outlet 15 for the withdrawal of a side stream is provided from the second highest plate of the column. This outlet 15 is connected to a cooler 16 and a receiver 17 for the intermediate fraction. Outlet 15 contains a valve 18, and, as shown in Figure 1A, is arranged from the level of the surface of the plate, so that the plate can be drained substantially completely. The size of outlet 15 is sufficiently large to allow the rapid removal of all the liquid which is present on the plate together with that which is returned to the plate from condenser 8 during the withdrawal of the intermediate fraction: (this applies whether the condenser is separate from the column, as in Figure 1, or integral therewith, as in Figure 3). An important feature of the apparatus is that a liquid seal, conveniently a U-shaped seal 19, is arranged in the outlet 15 close up to the column, to prevent the passage of vapours from the still into the intermediate fraction receiver 17 after the plate is drained of liquid.

The invention is applied by first concentrating the intermediate fraction in the upper part of the column 6 by the procedure of the parent case, and then, while returning all the condensate from 8 to the top of the column through line 10, withdrawing the intermediate fraction through outlet 15 either completely in one operation, but preferably in a sequence of short discharges with a period of total reflux between each discharge in order to re-concentrate the remaining portion of the intermediate fraction in the upper part of the column. The withdrawal of the intermediate fraction is continued until an appropriate amount (ascertained as in the parent case) has been removed. The intermediate fraction lying on the plates below that from which the side stream is withdrawn is gradually evaporated upwards by the vapour ascending from the still 5, and the intermediate fraction distilling over is condensed in condenser 8 and returned to the top of the column, from which it is eliminated in the side stream through the outlet 15.

Figure 2:
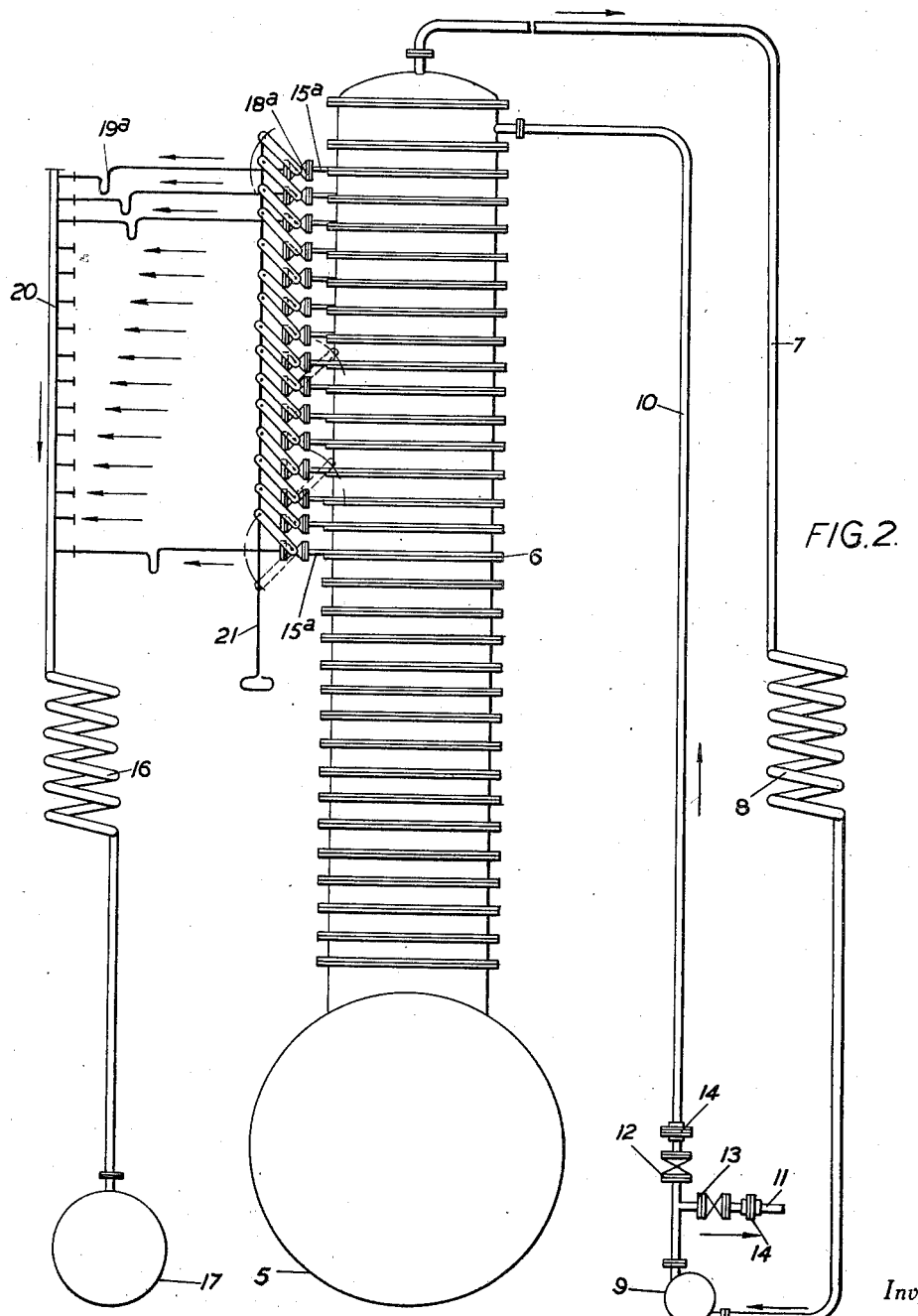

An alternative procedure according to the present invention is to drain the intermediate fraction simultaneously from all the plates of the column on which the fraction to be removed is present. A suitable arrangement for doing this is shown in Figure 2, in which the same reference numbers indicate the same parts as in Figure 1. From the surface of each of the (say) fifteen plates of the column below the highest plate, an outlet 15a is provided so that each plate can be drained substantially completely. Each outlet 15a is connected through a valve 18a and a liquid seal 19a to a manifold 20 leading to the cooler 16 and intermediate fraction receiver 17. The operating lever of each valve 18a can be individually coupled or uncoupled from an operating rod 21; consequently, the movement of the operating rod opens and closes simultaneously all the valves 18a to which it is coupled.

In the operation of the arrangement of Fig. 2, the amount of intermediate fraction to be removed is ascertained as in the parent case. Preliminary tests will indicate the number of plates on which intermediate fraction is present after its initial concentration in the column, and after any subsequent re-concentration. The appropriate number of valves 18a are then coupled to the operating rod 21 prior to each discharge of intermediate fraction.

It follows that in the arrangements of the present invention, when the outlets 15 or 15a is or are open for the withdrawal of the intermediate fraction, none of the liquid returned as total reflux to the top of the column will descend in the column below the plate or plates from which withdrawal of the intermediate fraction is made.

The arrangement of Figure 2 is capable of being operated in an alternative manner to effect the purpose of the present invention. In this method, when concentration of the intermediate fraction in the column has been effected by the procedure of the parent case, distillation is stopped by shutting off the supply of heat to the still 5, and at the same time the intermediate fraction is drained simultaneously from all the various plates on which it is present by opening a sufficient number of the valves 18a, leading the intermediate fraction to the receiver 17 as before.

Figure 3:
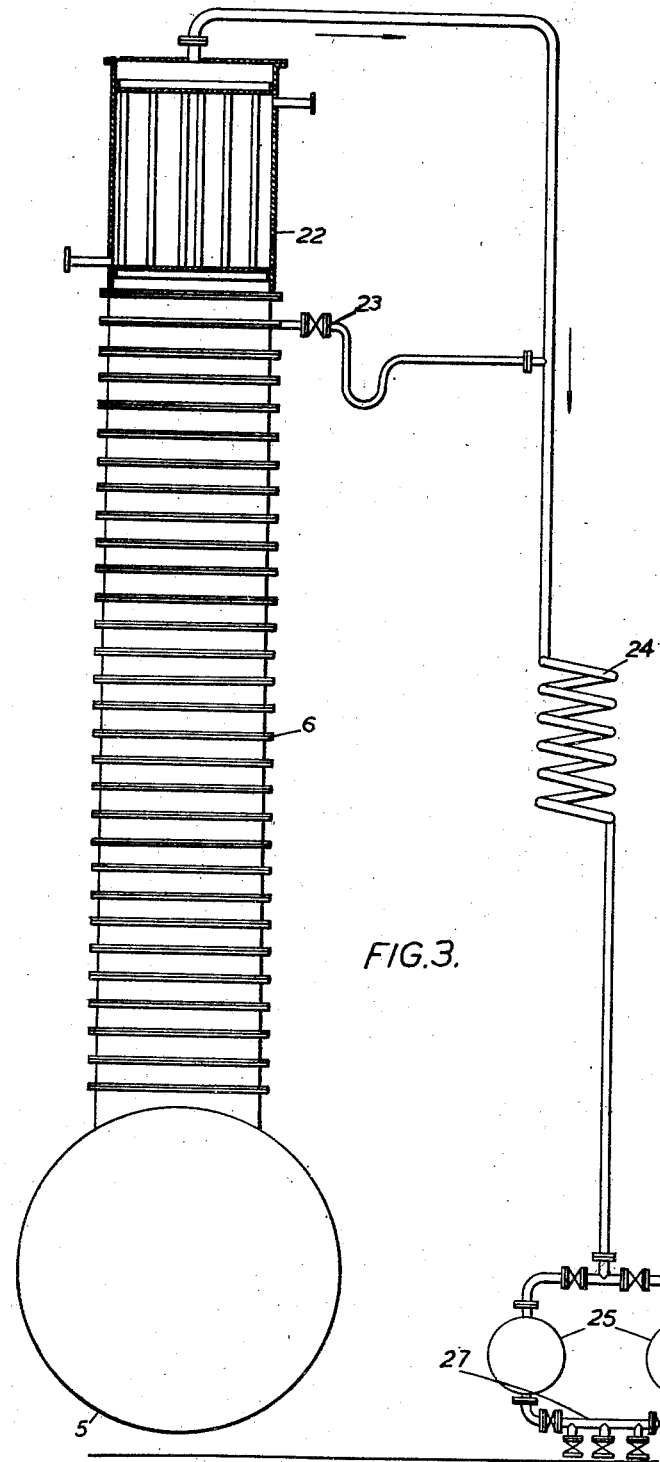
Figure 4:
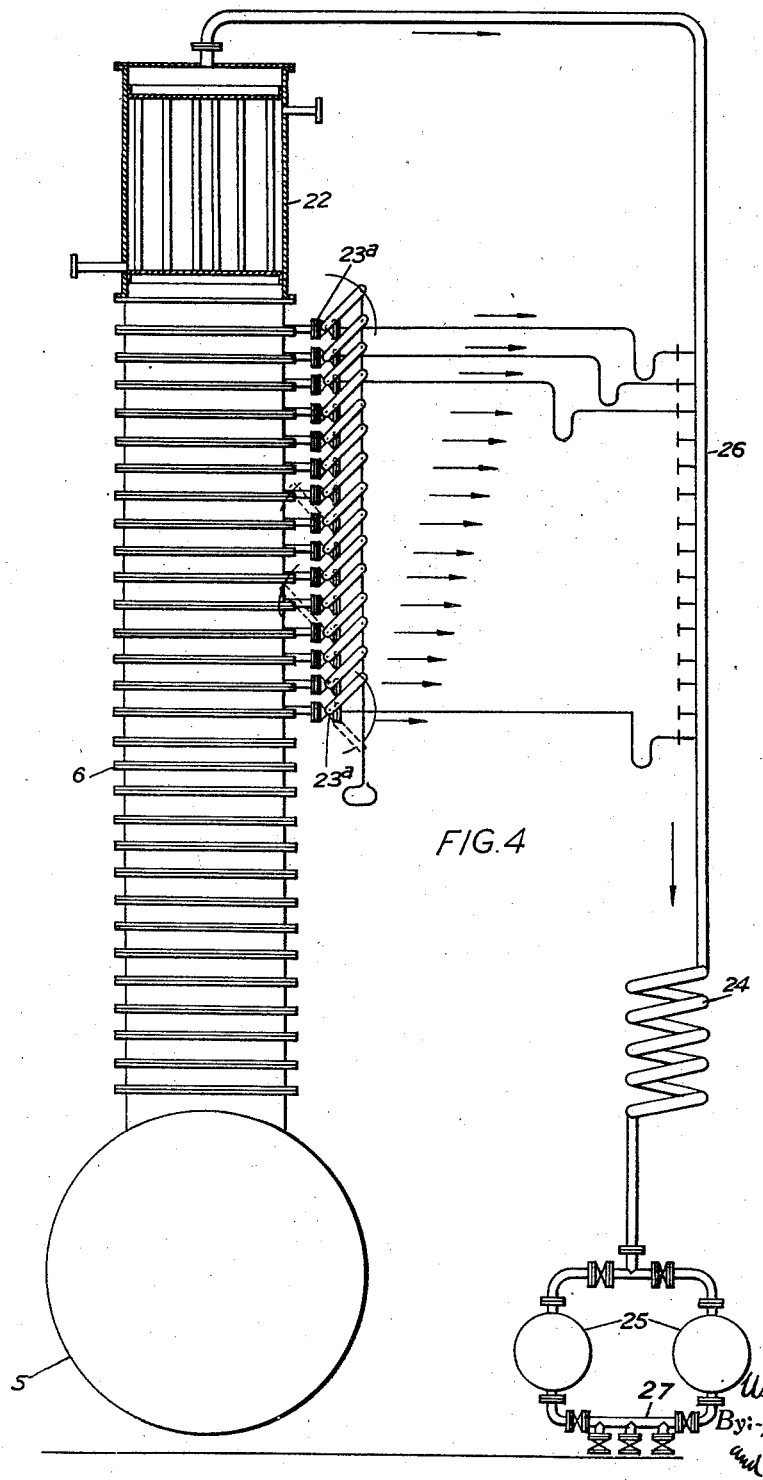

Figures 3 and 4 illustrate the application of the present invention to a fractionating column 6 having a dephlegmator 22 in place of a separate condenser. Figure 3 is comparable to Figure 1, in that a single side-stream outlet 23 is provided from the uppermost plate of the column. The side-stream outlet 23 communicates through a liquid seal as shown, with a cooler and test receivers 25 which are discharged through a manifold 27 to bulk containers appropriate to the fraction being produced. In this apparatus, during the steps of concentrating the intermediate fraction in the upper part of the column, and during the removal of the intermediate fraction the system is operated at such a distillation rate that the dephlegmator 22 serves as a total condenser to return all the distillate to the column 6. When the intermediate fraction has been withdrawn completely, the normal rate of distillation is again resumed, the dephlegmator then serving only to provide sufficient reflux to effect the necessary separation, product being condensed in the final condenser 24.

Figure 4 shows an arrangement comparable to that of Figure 2, in that a plurality of side-stream outlets are provided, one from each plate, leading to a manifold 26. The system is also operated, when necessary, at such a distillation rate that the dephlegmator 22 serves as a total condenser. The intermediate fraction is removed in the same manner as in the apparatus of Figure 2.

The maximum benefit will be obtained from the present invention if in all the applications described special care is taken to ensure that the condition of equilibrium in the column has been fully obtained before proceeding to remove the intermediate fraction. The time required for the achievement of this condition varies, and in particular it depends on the size and design of the fractionating column. Whereas in some commercial installations an initial period of total reflux for one hour has been adequate, in other plants the initial period of total reflux has with advantage been extended to about four hours, without unduly prejudicing the overall saving of time obtainable by means of the present invention, when compared with the normal method of operation.

It is desirable in all the embodiments of the invention above described, and particularly in the cases where a number of plates are totally drained to follow the final withdrawal of the intermediate fraction with a period of total reflux, in order to re-establish equilibrium conditions in the system before proceeding with the distillation of the next product.

In contrast to the procedure of the parent case, in the present invention the whole of the distillate is returned to the top plate of the column, not only during the concentration and any re-concentration of the intermediate fraction in the upper part of the column, but also during the withdrawal of the intermediate fraction.

It follows that in the present invention, when all the side-stream outlets are closed and the whole of the distillate is being returned to the column, a condition of total reflux exists in the column. Since each side-stream outlet is of large capacity and is located at the level of the plate surface and below the normal overflow level of the liquid lying on the plate, it is apparent that on the opening of any side-stream outlet there will be little or no overthrow of liquid from the associated plate to the plate below. Hence the opening of any side-stream outlet will create a condition of substantially zero reflux on all plates below that from which the side stream is being withdrawn.

As in the parent case, the present invention may be applied with great advantage to the separation of pure or nitration-pure toluole from washed raw toluole containing e. g. both benzole and xylole. The invention can also be applied advantageously to the distillation of crude or washed benzole. In this case, the lighter products such as carbon disulphide present in the crude benzole are treated as an intermediate fraction to be removed before the collection of the pure benzole. The lighter fractions are therefore first concentrated in the upper part of the fractionating column by the procedure of the parent case, and are then removed as if they were an intermediate fraction by any one of the alternating operational procedures of the present and/or the parent invention.

What I claim is:

1. In the separation of liquids of different boiling points from a mixture thereof by fractional distillation by a batch process in a batch still having a plate-type fractionating column associated with a condenser for the distillate and with a reflux return system, the method of removing the intermediate fraction resulting from the incomplete separation of one component of the mixture from the component of next higher boiling point, which consists in first concentrating the said intermediate fraction on the upper plates of the column by establishing a condition of total reflux in the column until a condition of equilibrium is attained therein and then draining the intermediate fraction rapidly as a side stream from at least one of the upper plates of the column at such a rate as to maintain a condition of zero reflux in the column below the plate from which the side stream is withdrawn during the withdrawal of the side stream while maintaining a condition of total reflux to the top of the column during the withdrawal of the side stream.

2. In the separation of liquids of different boiling points from a mixture thereof by fractional distillation by a batch process in a batch still having a plate-type fractionating column associated with a condenser for the distillate and with a reflux return system, the method of removing the intermediate fraction resulting from the incomplete separation of one component of the mixture from the component of next higher boiling point, which comprises the following sequence of steps: first concentrating the said intermediate fraction on the upper plates of the column by establishing a condition of total reflux in the column with no withdrawal of product until a condition of equilibrium is attained therein, then rapidly draining a portion of the intermediate fraction as a side stream from at least one of the upper plates of the column, the withdrawal of the side stream being effected at such a rate as to maintain a condition of zero reflux in the column below the plate from which the side stream is withdrawn during its withdrawal, then re-concentrating the remaining portion of the intermediate fraction in the upper part of the column, then rapidly draining a further portion of the intermediate fraction as a side stream from at least one of the upper plates of the column as before, repeating the last specified two steps as necessary until the whole of the intermediate fraction is eliminated from the system, maintaining a condition of total reflux to the top of the column during each withdrawal of a side stream, and then continuing the distillation to remove the next higher-boiling component.

3. In the separation of liquids of different boiling points from a mixture thereof by fractional distillation by a batch process in a batch still having a plate-type fractionating column associated with a condenser for the distillate and with a reflux return system, the method of removing the intermediate fraction resulting from the incomplete separation of one component of the mixture from the component of next higher boiling point, which consists in first concentrating the said intermediate fraction on the upper plates of the column by establishing a condition of total reflux in the column until a condition of equilibrium is attained therein, and then draining the whole of the intermediate fraction rapidly as side streams simultaneously from all the plates of the column on which it is present at such a rate as to maintain a condition of zero reflux in the column below the plates from which the side streams are withdrawn during their withdrawal, and maintaining a condition of total reflux to the top of the column during the withdrawal of the side streams.

4. In the separation of liquids of different boiling points from a mixture thereof as claimed in claim 1, the step of providing a period of total reflux following the complete elimination of the intermediate fraction and before proceeding to the withdrawal of the component of next higher boiling point.

5. In the separation of liquids of different boiling points from a mixture thereof as claimed in claim 2, the step of providing a period of total reflux following the complete elimination of the intermediate fraction and before proceeding to the withdrawal of the component of next higher boiling point.

6. In the separation of liquids of different boiling points from a mixture thereof as claimed in claim 3, the step of providing a period of total reflux following the complete elimination of the intermediate fraction and before proceeding to the withdrawal of the component of next higher boiling point.

7. In the separation of liquids of different boiling points from a mixture thereof by fractional distillation by a batch process in a batch still having a plate-type fractionating column associated with a condenser for the distillate and with a reflux return system, the method of removing the intermediate fraction resulting from the incomplete separation of one component of the mixture from the component of next higher boiling point, which consists in first concentrating the said intermediate fraction on the upper plates of the column by establishing a condition of total reflux in the column until a condition of equilibrium is attained therein, shutting off the supply of heat to the still, and then draining the whole of the intermediate fraction rapidly as side streams simultaneously from all the plates of the column on which it is present at such a rate as to maintain a condition of zero reflux in the column below the plates from which the side streams are withdrawn during their withdrawal, and maintaining a condition of total reflux to the top of the column during the withdrawal of the side streams.

WILLIAM JAMES CHADDER.